(12) United States Patent
Kim et al.

(10) Patent No.: US 9,684,122 B2
(45) Date of Patent: Jun. 20, 2017

(54) BACKLIGHT ASSEMBLY INCLUDING LIGHT LEAKAGE PREVENTING UNIT AND LIQUID CRYSTAL DISPLAY INCLUDING THE SAME

(71) Applicant: Samsung Display Co., Ltd., Yongin, Gyeonggi-Do (KR)

(72) Inventors: Sung-Won Kim, Asan-si (KR); Kyu-Tae Park, Ulsan (KR); Hyun Chul Jeong, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 130 days.

(21) Appl. No.: 14/583,914

(22) Filed: Dec. 29, 2014

(65) Prior Publication Data

US 2015/0185409 A1 Jul. 2, 2015

(30) Foreign Application Priority Data

Dec. 30, 2013 (KR) .......... 10-2013-0167502
Dec. 9, 2014 (KR) .......... 10-2014-0175952

(51) Int. Cl.
*G02F 1/1335* (2006.01)
*F21V 8/00* (2006.01)
*G02F 1/1333* (2006.01)

(52) U.S. Cl.
CPC ......... *G02B 6/0088* (2013.01); *G02B 6/0091* (2013.01); *G02F 1/1336* (2013.01);
(Continued)

(58) Field of Classification Search
CPC ............ G02B 6/0088; G02B 6/0091; G02F 1/133509; G02F 1/1336; G02F 2001/133317
(Continued)

(56) References Cited

U.S. PATENT DOCUMENTS

2009/0009679 A1* 1/2009 Ke .............. G02B 6/0031 349/58
2009/0103282 A1* 4/2009 Itaya ............. G02B 6/0068 362/97.1
(Continued)

FOREIGN PATENT DOCUMENTS

JP 2007012417 A * 1/2007
KR 1020080028581 A 4/2008
(Continued)

*Primary Examiner* — Hoan C Nguyen
(74) *Attorney, Agent, or Firm* — Cantor Colburn LLP

(57) ABSTRACT

Provided is a backlight assembly including: a light source which generates and emits light; a light leakage preventing member including a first horizontal portion and a first vertical portion; a light guide plate including a light input surface and a light output surface; an optical sheet disposed on the light output surface of the light guide plate; and a bottom chassis configured to receive the light source, the light leakage preventing member and the light guide plate therein, in which the light source is disposed at a side of the light guide plate, the first vertical portion of the light leakage preventing member is attached to a rear surface of the light source, and the first horizontal portion is positioned above the light source to overlap a portion of the light output surface of the light guide plate.

16 Claims, 9 Drawing Sheets

(52) U.S. Cl.
CPC ............... *G02F 1/133509* (2013.01); *G02F 2001/133317* (2013.01)

(58) Field of Classification Search
USPC ..................................................... 349/61, 62
See application file for complete search history.

(56) References Cited

U.S. PATENT DOCUMENTS

| | | | |
|---|---|---|---|
| 2010/0039580 A1* | 2/2010 | Chen ................. | G02F 1/133608 349/58 |
| 2012/0063122 A1 | 3/2012 | Yokota et al. | |
| 2012/0313889 A1* | 12/2012 | Chen ....................... | G06F 3/046 345/174 |
| 2013/0003339 A1* | 1/2013 | Chen ....................... | A47B 81/06 361/807 |
| 2013/0021782 A1* | 1/2013 | Yan ..................... | G02F 1/13452 362/97.4 |
| 2013/0107168 A1* | 5/2013 | Tang .................... | G02B 6/0088 349/62 |
| 2013/0182456 A1 | 7/2013 | Chin | |

FOREIGN PATENT DOCUMENTS

| | | |
|---|---|---|
| KR | 1020120070871 A | 7/2012 |
| KR | 1020130033570 A | 4/2013 |

* cited by examiner

BACKLIGHT ASSEMBLY INCLUDING LIGHT LEAKAGE PREVENTING UNIT AND LIQUID CRYSTAL DISPLAY INCLUDING THE SAME

This application claims priority to Korean Patent Application Nos. 10-2013-0167502 and 10-2014-0175952 respectively filed on Dec. 30, 2013 and Dec. 9, 2014, and all the benefits accruing therefrom under 35 U.S.C. §119, the entire contents of which are incorporated herein by reference.

BACKGROUND (a) Field

The invention relates to a backlight assembly and a liquid crystal display including the same, and more particularly, to a backlight assembly including a light leakage preventing member and a liquid crystal display including the same.

(b) Description of the Related Art

A liquid crystal display includes a liquid crystal display module, a bottom chassis supporting the bottom of the liquid crystal display module, and a top case fastened with the bottom chassis to fix the liquid crystal display module. The liquid crystal display module includes a liquid crystal panel displaying an image, a flexible printed circuit board ("FPCB") provided on one end of the liquid crystal panel, and a backlight assembly disposed on the bottom of the liquid crystal panel to provide light thereto.

In the liquid crystal panel and the backlight assembly, the FPCB on which a light source is mounted is received at one side of a main support such as a molded article having a square frame shape, and a light guide plate and optical sheets are received to be parallel with the light source.

SUMMARY

In a liquid crystal panel and a backlight assembly, a flexible printed circuit board ("FPCB) on which a light source is mounted is fixed to one side of a main support such as by a fixed tape, and a light blocking tape is disposed between the liquid crystal panel and the backlight assembly to fix the liquid crystal panel and the backlight assembly to each other. When leakage of light emitted from the fixed light source occurs with respect to an optical sheet, the light leakage may be recognized as a display defect. As a result, the light blocking tape needs to be applied and thus material costs when manufacturing the backlight assembly may be increased.

One or more exemplary embodiment of the invention provides a backlight assembly and a liquid crystal display including the same having advantages of reducing or preventing light leakage, by disposing a light leakage preventing member within the backlight assembly to cover the top of a light source in the backlight assembly.

Further, one or more exemplary embodiment of the invention provides a backlight assembly and a liquid crystal display including the same having advantages of excluding a separate mold frame for mounting a display panel, by additionally including a display panel mounting part through a structural change of the light leakage preventing member. One or more exemplary embodiment of the invention further provides a simplified manufacturing process of the liquid crystal display, by the light leakage preventing member as a single element serving to both hold a light source and reduce or effectively prevent light leakage.

An exemplary embodiment of the invention provides a backlight assembly including: a light source which generates and emits light; a light leakage preventing member including a first horizontal portion and a first vertical portion; a light guide plate including a light input surface and a light output surface; an optical sheet disposed on the light output surface of the light guide plate; and a bottom chassis configured to receive the light source, the light leakage preventing member and the light guide plate therein. The light source is disposed at a side of the light guide plate, the first vertical portion of the light leakage preventing member is attached to a rear surface of the light source, and the first horizontal portion is disposed above the light source to overlap a portion of the light output surface of the light guide plate.

The backlight assembly may further include an auxiliary chassis which is received in the bottom chassis; and a mold frame which is on the bottom chassis and surrounds an outer portion of the bottom chassis and the auxiliary chassis. The light source may be attached to a side portion of the auxiliary chassis.

The light leakage preventing member may be coupled to and fixed between the bottom chassis and the side portion of the auxiliary chassis.

The light source may be disposed at least at one side of the bottom chassis.

The light leakage preventing member may further include a first bending part extended to be bent from a distal end of the first horizontal portion of the light leakage preventing member, and the first bending part may be curved toward the first vertical portion from the distal end of the first horizontal portion.

A surface of the first bending part and a surface of the first horizontal portion may face each other and be spaced apart from each other.

The backlight assembly may further include a panel mounting part integral with the light leakage preventing member, and including: a second vertical portion extended from the first vertical portion of the light leakage preventing member, and a second horizontal portion extended from the second vertical portion to be spaced apart from the first horizontal portion, and the light leakage preventing member and the panel mounting part may be disposed at all sides of the bottom chassis at which the light source is disposed.

The light leakage preventing member may further include a first bending part extended to be bent from a distal end of the first horizontal portion of the light leakage preventing member; and the panel mounting part may further include a second bending part extended to be bent from a distal end of the second horizontal portion of the panel mounting part, for which the first bending part may be curved toward the first vertical portion from the distal end of the first horizontal portion, and the second bending part may be curved toward the second vertical portion from the distal end of the second horizontal portion.

A surface of the first bending part and a surface of the first horizontal portion may face each other to be spaced apart from each other, and a surface of the second bending part and a surface of the second horizontal portion may face each other to be spaced apart from each other.

The backlight assembly may further include a panel guide part extended from and integral with the panel mounting part.

The light leakage preventing member, the panel mounting part and the panel guide part may include a metallic material, and the light source may be directly attached to the first vertical portion of the light leakage preventing member.

Another exemplary embodiment of the invention provides a liquid crystal display including: a liquid crystal panel which displays an image; and a backlight assembly which supplies light to the liquid crystal panel. The backlight assembly includes a light source which generates and emits the light, a light leakage preventing member including a first horizontal portion and a first vertical portion, a light guide plate including a light input surface and a light output surface, an optical sheet disposed to overlap the light output surface of the light guide plate, and a bottom chassis configured to receive the light source, the light leakage preventing member and the light guide plate therein. The light source is disposed at a side of the light guide plate, the first vertical portion of the light leakage preventing member is attached to a rear surface of the light source at a side of the bottom chassis, and the first horizontal portion is disposed above the light source to overlap at least a portion of the light output surface of the light guide plate.

According to one or more exemplary embodiment of the invention, light leakage at the end of the optical member may be reduced or effectively prevented, by disposing a light leakage preventing member within the backlight assembly to cover the top of a light source in the backlight assembly.

Further, a mold frame for mounting a panel may be omitted, by additionally including a panel mounting part as a varied structure of the light leakage preventing unit also including the light leakage preventing member. Furthermore, in one or more exemplary embodiment of the backlight assembly and the liquid crystal display including the same according to the invention, a manufacturing process of the liquid crystal display may be simplified, by combining the function of a light source holder and the light leakage preventing member together in a single light leakage preventing unit.

Further, a standard error which may occur when manufacturing the backlight assembly may be compensated, by including the light leakage preventing member within the backlight assembly, where the light leakage preventing member reduces an impact which may be applied to the liquid crystal display from the outside thereof.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
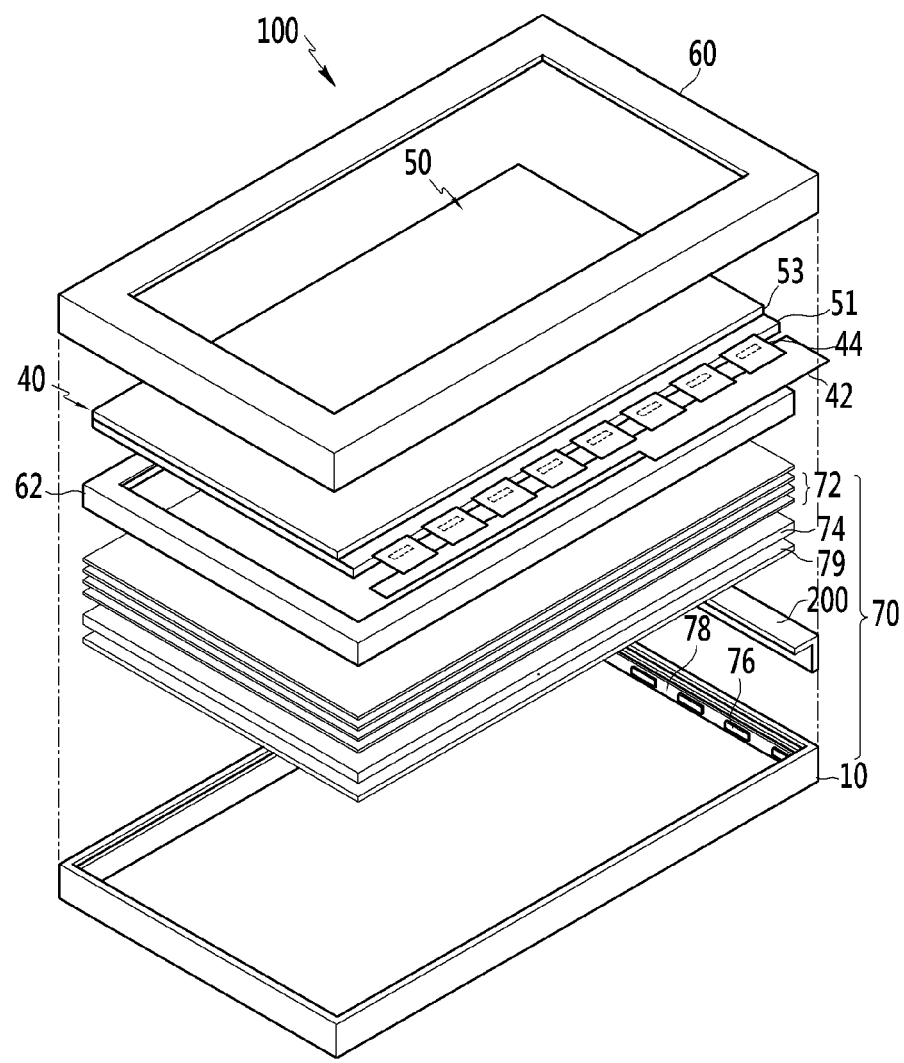
FIG. 1 is an exploded perspective view of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a backlight assembly and a liquid crystal display including the same according to exemplary embodiments of the invention will be described in detail with reference to the accompanying drawings.

Hereinafter, an exemplary embodiment of a liquid crystal display according to the invention will be described with reference to FIGS. 1 to 4.

Figure 2:
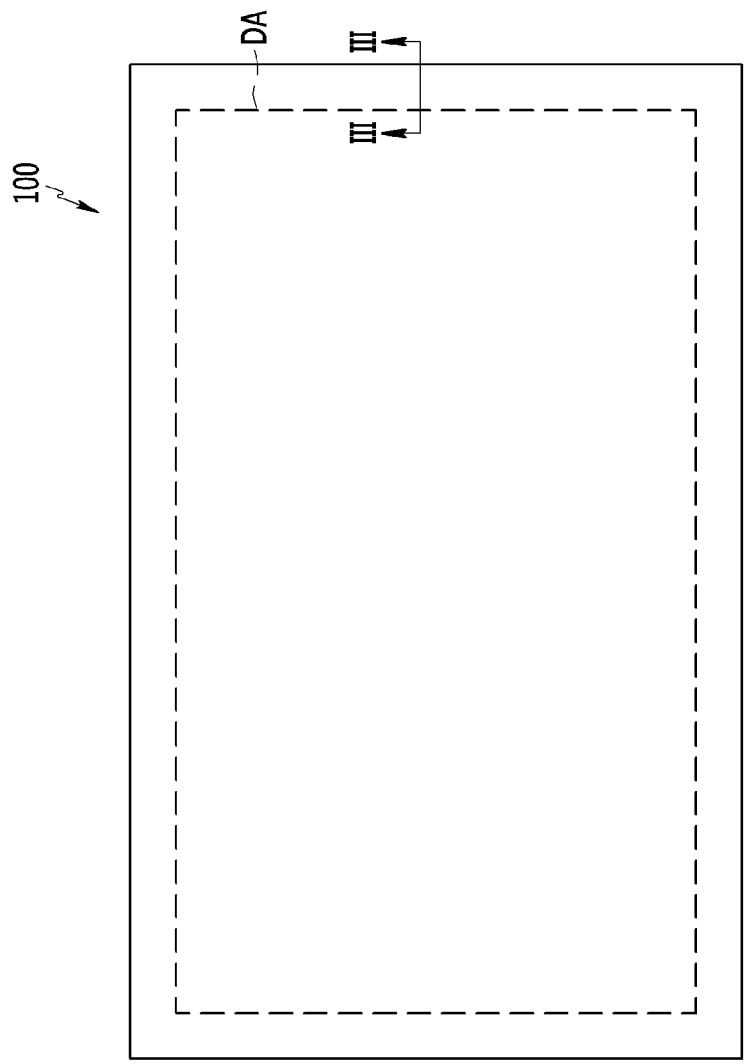
FIG. 2 is a plan view of the liquid crystal display of FIG. 1 in an assembled state.
Figure 3:
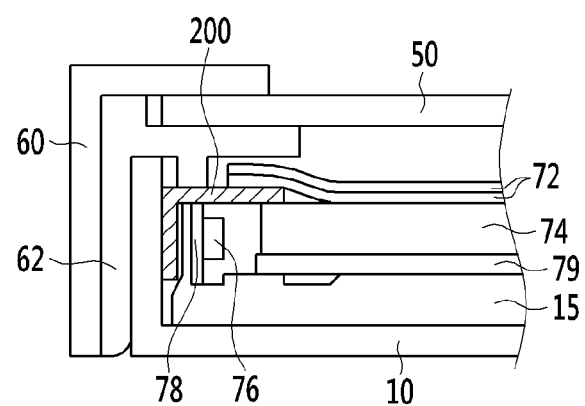
FIG. 3 is a cross-sectional view taken along line III-III of FIG. 2.
Figure 4:
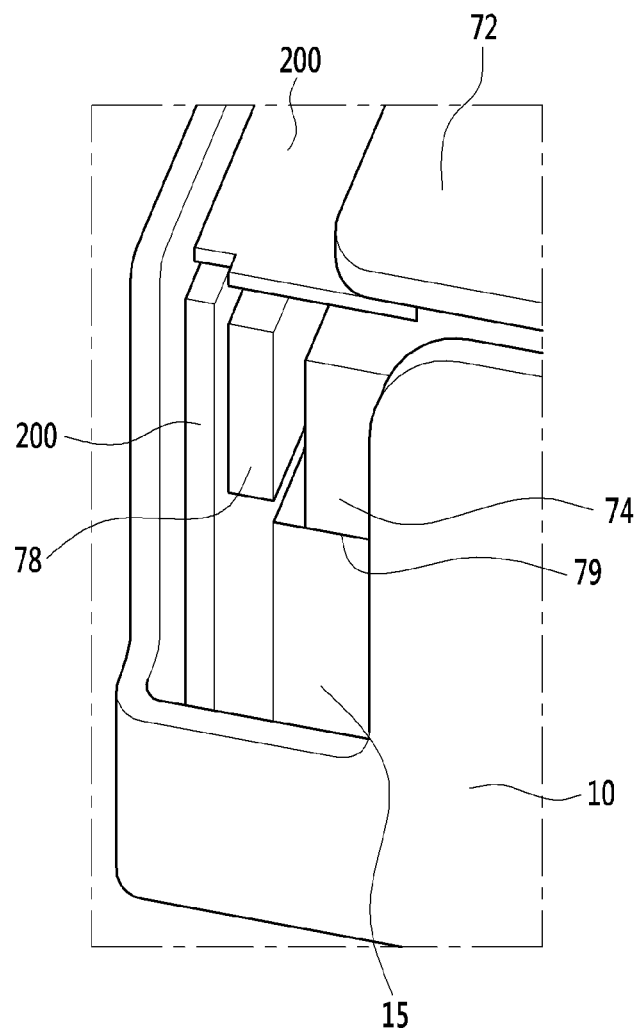
FIG. 4 is an enlarged perspective view of an edge of the liquid crystal display of FIG. 1 in an assembled state.

FIG. 1 is an exploded perspective view of an exemplary embodiment of a liquid crystal display according to the invention, FIG. 2 is a plan view of the liquid crystal display of FIG. 1 in an assembled state, FIG. 3 is a cross-sectional view taken along line III-III of FIG. 2, and FIG. 4 is an enlarged perspective view of an edge of the liquid crystal display of FIG. 1 in an assembled state.

A backlight unit 70 generates and supplies light to the liquid crystal panel 50. The backlight unit 70 includes a plurality of light sources 76 which generate and supply the light, and the light sources 76 are arranged in parallel at a side of a bottom chassis 10 to emit a relatively large quantity of light. As used herein, reference numeral 76 may refer to a single light source or a plurality of light sources.

A structure of the liquid crystal display 100 illustrated in FIGS. 1 to 4 is provided to exemplify the invention, and the invention is not limited thereto. Accordingly, the invention may also be applied to liquid crystal displays having other structures, and an arrangement form of the light sources may be various. As an example, the light sources 76 are illustrated to be arranged only at one side of the bottom chassis 10 in FIGS. 1 to 4, but may also be arranged at a plurality of sides of the bottom chassis 10.

Further, the light source 76 may include a light emitting diode, or various lamps such as a cold cathode fluorescent lamp ("CCFL") may be arranged as a light source 76.

A liquid crystal display 100 according to the invention illustrated in FIGS. 1 to 4 is largely configured by the backlight unit 70 generating and supplying the light, and a liquid crystal panel unit 40 displaying an image corresponding to the light from the backlight unit 70. In addition, in order to fix and support the backlight unit 70 and the liquid crystal panel unit 40, a top chassis 60, an upper mold frame 62, an auxiliary chassis 15 and a bottom chassis 10 are coupled with the backlight unit 70 and the liquid crystal panel unit 40. In an exemplary embodiment, the top chassis 60 and the auxiliary chassis 15 may be omitted. The auxiliary chassis 15 may be considered a part of the backlight assembly 70 or a part of the overall liquid crystal display 100.

Referring to FIG. 2, the liquid crystal display 100 includes a display area DA in which an image is displayed, and a non-display area surrounding the display area, in a top plan view.

The backlight unit 70 generates and supplies the light to the liquid crystal panel unit 40 and guides the light to improve luminance. The liquid crystal panel unit 40 positioned on the backlight unit 70 controls a liquid crystal panel 50 which is a flat panel display panel on which the image is displayed.

The liquid crystal panel unit 40 includes the liquid crystal panel 50, a tape carrier package ("TCP") 44 and a printed circuit board ("PCB") 42. The liquid crystal panel 50 is configured by a thin film transistor ("TFT") substrate 51 including a plurality of TFTs, a color filter substrate 53 positioned on the TFT substrate 51, and a liquid crystal (not illustrated) disposed between the substrates 51 and 53. Polarizers (not illustrated) are attached to the top of the color filter substrate 53 and the bottom of the TFT substrate 51 to linearly polarize visible light supplied from the backlight unit 70.

The TFT substrate 51 includes a transparent glass base substrate on which is disposed TFTs arranged in a matrix shape. A data line disposed on the transparent glass base substrate is connected to a source terminal of a TFT and a gate line is connected to a gate terminal of the TFT. In addition, a pixel electrode including transparent indium tin oxide ("ITO") as a conductive material is disposed connected to a drain terminal of the TFT.

When an electric signal is input from the PCB 42 to the data line and the gate line of the liquid crystal panel 50 described above, the electric signal is input to the source terminal and the gate terminal of the TFT, and the TFT is turned on or off according to the input of the electric signal, and then an electric signal is output to the drain terminal to form a pixel image.

The color filter substrate 53 is disposed on the TFT substrate 51 to face the TFT substrate 51. The color filter substrate 53 includes a base substrate on which is disposed red, green and blue ("RGB") pixels which are color pixels in which predetermined colors are expressed when light is transmitted therethrough, and a common electrode including ITO at a front surface of the color filter substrate 53. In an exemplary embodiment of manufacturing the liquid crystal display 100, the color filters may be formed in a thin film process, and the common electrode may be coated on the base substrate of the color filter substrate 53. When the TFT is turned on by applying power to the gate terminal and the source terminal of the TFT, an electric field is formed between the pixel electrode, and the common electrode of the color filter substrate 53. An alignment angle of the liquid crystal disposed between the TFT substrate 51 and the color filter substrate 53 is changed by the electric field and light transmittance is changed according to the changed alignment angle. As a result, a desired pixel image is obtained.

In order to control the alignment angle of the liquid crystal of the liquid crystal panel 50 and a timing when the liquid crystal is arranged, a driving signal and a timing signal are applied to the gate line and the data line. In order to determine a timing of applying a data driving signal and a gate driving signal, the TCP 44 is attached to the liquid crystal panel 50.

The PCB 42 for applying the driving signals to the data line and the gate line by receiving an image signal from outside the liquid crystal panel 50 is connected with the TCP 44 attached to the liquid crystal panel 50.

The PCB 42 generates a data driving signal, a gate driving signal, and a plurality of timing signals for applying the data and gate driving signals at an appropriate time to the gate line and the data line of the liquid crystal panel 50 through the TCP 44, respectively, to drive the liquid crystal display 100.

The backlight unit 70 is provided below the liquid crystal panel unit 40 and uniformly supplies light to the liquid crystal panel unit 40.

The backlight unit 70 is received and fixed onto the bottom chassis 10. The backlight unit 70 includes an auxiliary chassis 15 which has a shape which is surrounded by the bottom chassis 10, light sources 76 arranged to be spaced apart from each other at a predetermined distance and fixed at a side of the bottom chassis 10 in a plan view, a light guide plate 74 configured to guide light from the light sources 76 to the liquid crystal panel 50, a reflective sheet 79 received to be adjacent to the bottom of the bottom chassis 10 and configured to reflect the light emitted from the light sources 76 at the side of the bottom chassis 10, a light source holder 78 at a rear side of the light sources 76 and fixing and supporting the light sources 76 within the backlight assembly 70, an optical member 72 including one or more optical sheet configured to supply light to the liquid crystal panel unit 40 by ensuring a luminance characteristic of the light from the light sources 76, and a light leakage preventing member 200 for reducing or effectively preventing the light emitted from the light guide plate 74 and the light sources 76 from being leaked. The light sources 76 and the light source holder 78 upon which the light sources 76 are disposed may collectively be referred to as a light source unit.

The light guide plate 74 includes a light input surface through which light from the light sources 76 enters the light guide plate 74, a light output surface through which light exits from the light guide plate 74, a rear surface opposite to the light output surface, and side surfaces connecting the light output and rear surfaces to each other. A side surface among the side surfaces connecting the light output and rear surfaces to each other may be the light input surface. The light input surfaces may have a rectilinear or curved profile in a cross-sectional view of the light guide plate 74.

As described above, the light source unit 76 and 78 illustrated in FIGS. 1 to 4 are disposed at only one side of the bottom chassis 10, but may be disposed at a plurality of sides of the bottom chassis 10. Where a plurality of light source units 76 and 78 is arranged at sides of the bottom chassis 10 other than the side illustrated in FIGS. 1 to 4, the light leakage preventing member 200 may be additionally disposed at those other sides where the light source units 76 and 78 are disposed.

The auxiliary chassis 15 may include a bottom portion, and a side portion connected with the bottom portion. The light source unit 76 and 78 may be fixed to the side portion of the auxiliary chassis 15. The light source unit 76 and 78 may be fixed to the auxiliary chassis 15 such as by an adhesive member, a screw member, and the like.

Referring to FIGS. 2 to 4, the light leakage preventing member 200 according to the invention is disposed at one side of the liquid crystal display 100 at which the light sources 76 are disposed. In a cross-sectional view, the light leakage preventing member 200 includes a vertical portion, and a horizontal portion which extends from the vertical portion to cover the top of the light sources 76. The vertical portion of the light leakage preventing member 200 may extend along the side portion of the auxiliary chassis 15.

The vertical portion of the light leakage preventing member 200 serves to fix the light leakage preventing member 200 to the bottom chassis 10 and/or the auxiliary chassis 15. The horizontal portion of the light leakage preventing member 200 serves to reduce or effectively prevent the light emitted from the light sources 76 from being leaked at the side of the liquid crystal display 100 at which the light sources 76 are disposed.

Referring to FIGS. 3 and 4, the vertical portion of the light leakage preventing member 200 may be coupled to the bottom chassis 10 and/or the auxiliary chassis 15 to be fixed within a space defined between the bottom chassis 10 and the auxiliary chassis 15. The vertical portion of the light leakage preventing member 200 may be coupled to the bottom chassis 10 and/or the auxiliary chassis 15 solely by engagement with the bottom chassis 10 and/or the auxiliary chassis 15, or may be further fixed to the bottom chassis 10 and/or the auxiliary chassis 15 such as by an adhesive member, a screw member, and the like.

The light leakage preventing member 200 covers (e.g., overlaps) an end of an upper surface of the light guide plate 74, to be disposed below an end of the optical member 72, such as within the non-display area of the liquid crystal display 100. The horizontal portion of the light leakage preventing member 200 covers the top of an entirety of the light sources 76 to block the light emitted from the light sources 76 at the lower portion of the optical member 72, to thus prevent the light from being leaked through the end of the optical member 72.

Since the light leakage preventing member 200 disposed within the backlight assembly 70 may reduce or effectively prevent the light emitted from the light sources 76 from being leaked, a light blocking tape (e.g., black tape) disposed between the liquid crystal panel 50 and the backlight assembly 70 to fix the liquid crystal panel 50 and the backlight assembly 70 to each other and generally preventing the light leakage may be omitted.

In FIGS. 1 to 4, the light sources 76 is disposed at one side of the liquid crystal display 100 and the light leakage preventing member 200 is also disposed only at the one side of the liquid crystal display 100. However, as described above, the light sources 76 may be disposed at a plurality of sides and a plurality of light leakage preventing members 200 may be included within the backlight assembly 70 at the plurality of sides where the light sources 76 are disposed.

An inverter board (not illustrated) which is a PCB for power supply and a PCB (not illustrated) for signal conversion are installed on the rear side of the bottom chassis 10. The inverter board transforms external power to a predetermined voltage level to provide the transformed power to the light sources 76 such as light emitting diodes, and the PCB for signal conversion is connected with the aforementioned PCB 42 to convert an analog data signal into a digital data signal to provide the converted digital data signal to the liquid crystal panel 50.

The top chassis 60 for preventing the liquid crystal panel unit 40 from deviating from the bottom chassis 10 while the TCP 44 is curved to the outside of the mold frame 62, is provided on the liquid crystal panel unit 40. Although not illustrated in FIGS. 1 to 4, a front case and a rear case are further positioned at the upper portion of the top chassis 60 and the lower portion of the bottom chassis 10, respectively, and coupled with each other to form the liquid crystal display 100. In an exemplary embodiment, the top chassis 60 may be omitted.

Next, a liquid crystal display according to the invention will be described in detail with reference to FIGS. 5 and 6.

Figure 5:
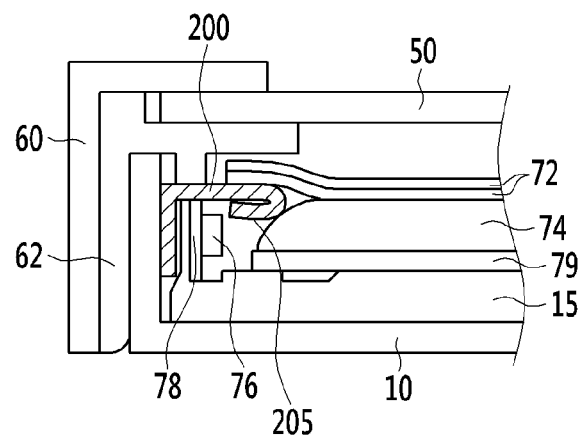
FIGS. 5 and 6 are respectively cross-sectional and enlarged perspective views of another exemplary embodiment of a liquid crystal display according to the invention.
Figure 6:
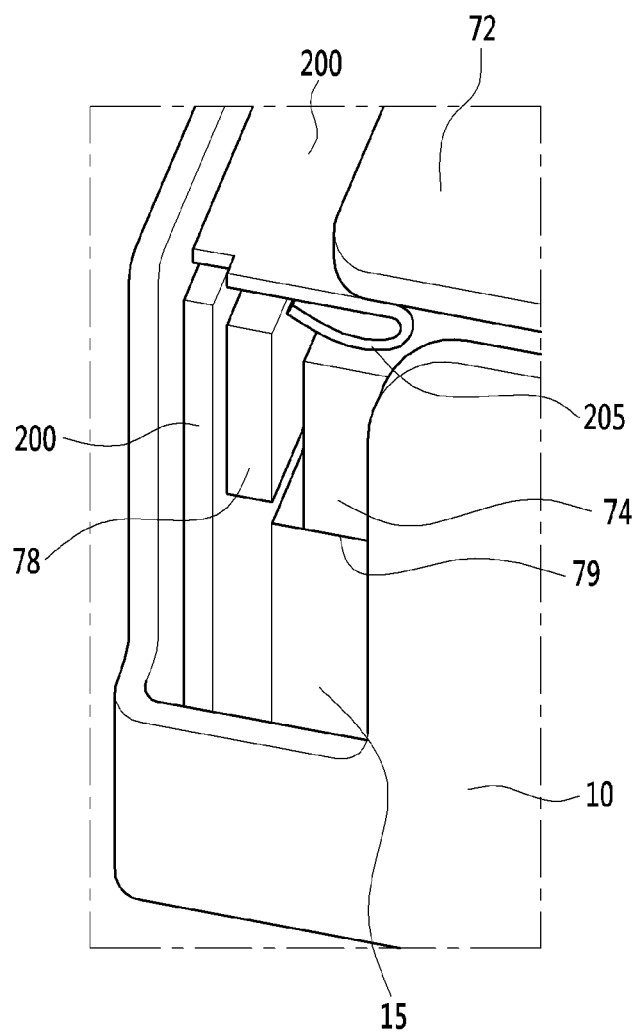

FIGS. 5 and 6 are respectively cross-sectional view and enlarged perspective views of another exemplary embodiment of liquid crystal display according to the invention.

When the liquid crystal display according to illustrated in FIGS. 5 and 6 is compared with the liquid crystal display illustrated in FIGS. 1 to 4, the two liquid crystal displays are substantially the same as each other except for a bending part 205 of the light leakage preventing member 200 is formed when the horizontal portion of the light leakage preventing member 200 is further extended and bent, and thus the duplicated description is omitted.

Referring to FIGS. 5 and 6, the light leakage preventing member 200 includes a horizontal portion disposed at one side of the bottom chassis 10 at which the light sources 76 are disposed to cover the top of the light sources 76, a vertical portion extending from the horizontal portion, and a bending part 205 extended and bent from a distal end of the horizontal portion. The bending part 205 of the light leakage preventing member 200 may form the distal end thereof. The horizontal portion of the light leakage preventing member 200 may extend away from the vertical portion, where the bending part 205 is disposed to extend toward the vertical portion.

The bending part 205 of the light leakage preventing member 200 has a curved shape formed with the end of the horizontal portion of the light leakage preventing member 200 to define a gentle curve to therefore extend toward vertical portion of the light leakage preventing member 200. With the bending part 205 of the light leakage preventing member 200 extended toward the vertical portion from the end of the horizontal portion, one surface of the horizontal portion and one surface of the bending part 205 may face each other, where the one surface is a common surface of the light leakage preventing member 200.

The horizontal portion and the bending part 205 of the light leakage preventing member 200 covers (e.g., overlaps) an end of an upper surface of the light guide plate 74, to be disposed below an end of the optical member 72, such as within the non-display area of the liquid crystal display 100. The horizontal portion and the bending part 205 of the light leakage preventing member 200 covers the top of an entirety of the light sources 76 to block the light emitted from the light sources 76 at the lower portion of the optical member 72, to thus prevent the light from being leaked through the end of the optical member 72.

A separation space is formed between the bending part 205 and the horizontal portion of the light leakage preventing member 200 to add more light blocking function, so as to doubly reduce or effectively prevent the light emitted from the light sources 76 from being leaked through the horizontal portion and the bending part 205 of the light leakage preventing member 200.

A predetermined separation space is formed between the bending part 205 and the horizontal portion of the light leakage preventing member 200 to compensate for a step defined among the light guide plate 74, the optical member 72, and the light leakage preventing member 200 such as due to an error when manufacturing the light leakage preventing member 200.

In addition, the separation space between the bending part 205 and the horizontal portion of the light leakage preventing member 200 may serve to reduce impact applied to the liquid crystal panel 50 from the outside thereof.

Further, since the end of the horizontal portion of the light leakage preventing member 200 may be formed in a relatively gently curved shape where the bending part 205 further extends from the horizontal portion, damage such as a scratch to the light guide plate 74 and/or the optical member 72 which may occur by contact with a non-curved end of the horizontal portion of the light leakage preventing member 200, may be reduced or effectively prevented.

Next, a liquid crystal display will be described in detail with reference to FIGS. 7 and 8.

Figure 7:
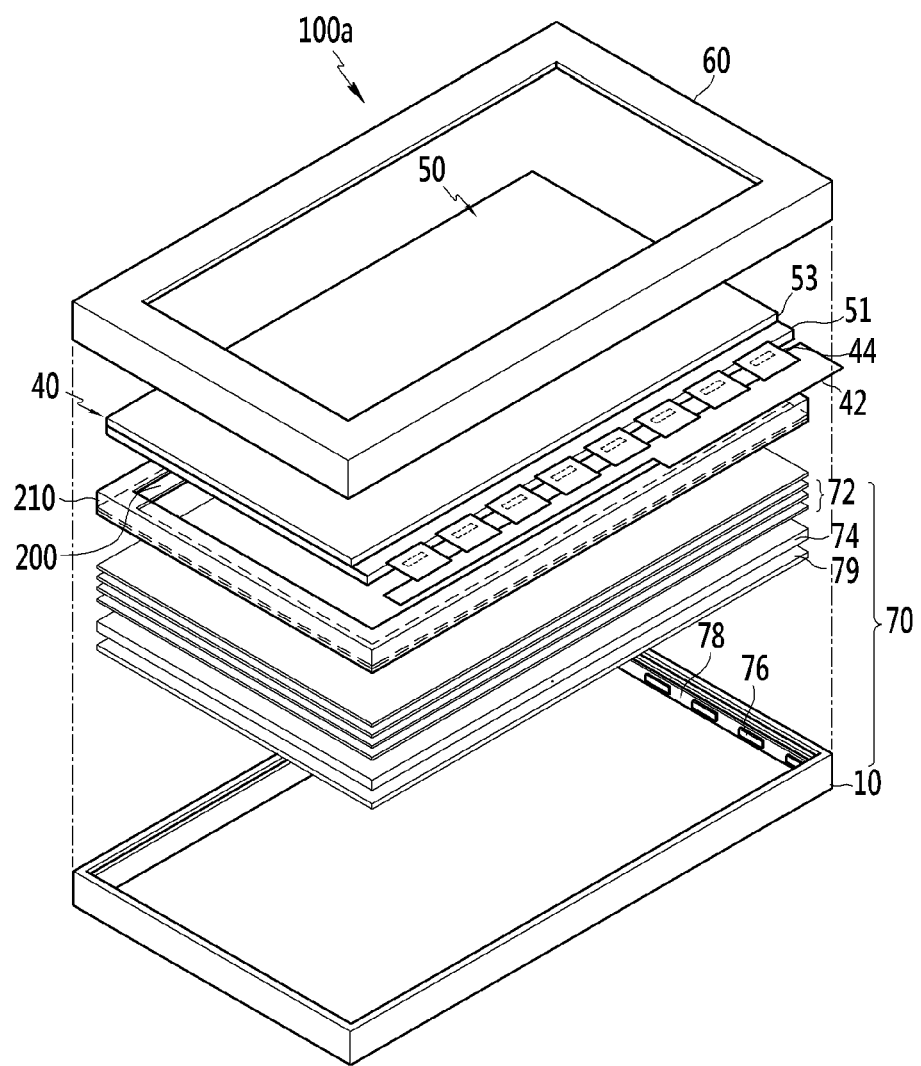
FIG. 7 is an exploded perspective view of still another exemplary embodiment of a liquid crystal display according to the invention.
Figure 8:
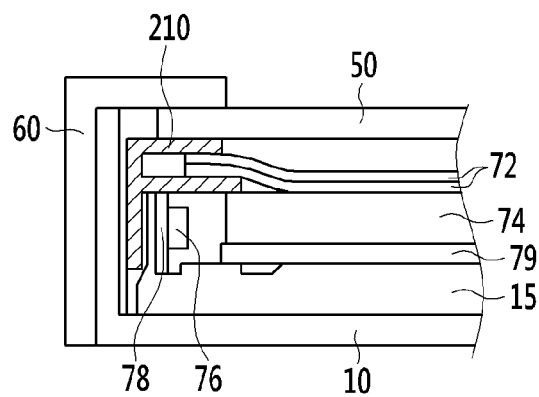
FIG. 8 is a cross-sectional view of the liquid crystal display of FIG. 7 according to the invention.

FIG. 7 is an exploded perspective view of still another exemplary embodiment of a liquid crystal display according to the invention and FIG. 8 is a cross-sectional view of the liquid crystal display of FIG. 7 according to the invention.

When the liquid crystal display illustrated in FIGS. 7 and 8 is compared with the liquid crystal display illustrated in FIGS. 1 to 4, the two exemplary embodiments are substantially the same as each other except for the light leakage preventing member and the mold frame, and the duplicated description is omitted.

As illustrated in FIGS. 7 and 8, the liquid crystal display further includes a panel mounting part 210 upon which the liquid crystal panel 50 is disposed. The light leakage preventing member 200 and the panel mounting part 210 may be integral with each other so as to collectively form a light leakage preventing unit.

The light leakage preventing member 200 of the liquid crystal display 100a in FIG. 7 is disposed on all sides of the bottom chassis 10, unlike the light leakage preventing member 200 illustrated in FIGS. 1 to 4 which is disposed at only one side where the light sources 76 are disposed.

In order for the panel mounting part 210 to support the liquid crystal panel 50 thereon, the panel mounting part 210 is disposed at all four sides of the bottom chassis 10 for mounting the liquid crystal panel 50 on the backlight unit 70.

The horizontal portion of the light leakage preventing member 200 may have a larger length taken from the vertical portion thereof than the horizontal portion of the panel mounting part 210 taken from the vertical portion thereof, so as to reduce or effectively prevent the light emitted from the light sources 76 at the lower portion of the optical member 72 from being leaked through the end of the optical member 72.

In the liquid crystal display described above, the panel mounting part 210 and the horizontal surfaces of the light leakage preventing member 200 is disposed to correspond to all sides of the bottom chassis 10 in order to support the liquid crystal panel 50 at the all sides, but the invention is not limited thereto. In an alternative exemplary embodiment, the panel mounting part 210 of the light leakage preventing unit may be disposed to correspond to all sides of the bottom chassis 10, but the horizontal portion of the light leakage preventing member 200 may be disposed at only the side where the light sources 76 are disposed among all the sides of the bottom chassis 10.

In the liquid crystal display of FIGS. 7 and 8 according to the invention, since the light leakage preventing unit additionally includes the panel mounting part 210, the mold frame 62 (refer to FIGS. 1, 3 and 5) for mounting and fixing the liquid crystal panel 50 may be omitted and the structure of the liquid crystal display may be relatively simplified.

A liquid crystal display will be described in detail with reference to FIG. 9.

Figure 9:
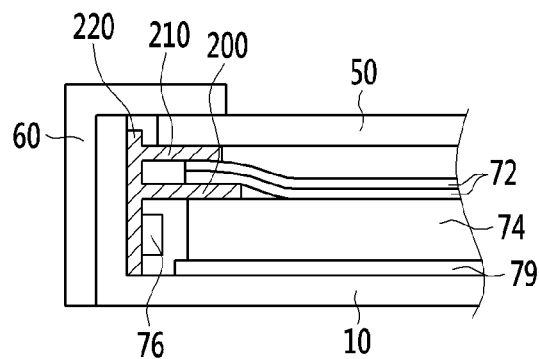
FIG. 9 is a cross-sectional view of yet another exemplary embodiment of a liquid crystal display according to the invention.

FIG. 9 is a cross-sectional view of yet another exemplary embodiment of a liquid crystal display according to the invention.

When the liquid crystal display illustrated in FIG. 9 is compared with the liquid crystal display illustrated in FIGS. 7 and 8, the two exemplary embodiments are substantially the same as each other except for a panel guide part, a light source holder, and an auxiliary chassis and the duplicated description is omitted.

As illustrated in FIG. 9, the liquid crystal display further includes a panel mounting part 210 and a panel guide part 220 for fixing the liquid crystal panel 50. The light leakage preventing member 200, the panel mounting part 210 and the panel guide part 220 may be integral with each other so as to collectively form a light leakage preventing unit.

The panel guide part 220 protrudes upward from an outer surface of the panel mounting part 210 and surrounds an outermost portion of the liquid crystal panel 50 to guide the liquid crystal panel 50 to be fixed at a constant position within the liquid crystal display 100a.

Further, in the liquid crystal display 100a including the light leakage preventing member 200, the light sources 76 may be directly fixed to the vertical portion of the light leakage preventing member 200, to exclude the light source holder 78 from the backlight unit 70.

The auxiliary chassis 15 (refer to FIGS. 1-6) for attaching the light source holder 78 within the backlight unit 70 may include a plastic non-conductive material, and thus the separate light source holder 78 is attached to one or more of the light sources 76, but the invention is not limited thereto. Referring to FIG. 9, the light leakage preventing member 200 may include a metallic material, and the metallic material has a conductive property. Thus, the conductive vertical portion of the light leakage preventing member 200 is usable as a light source holder, and as a result, the backlight unit 70 excludes the separate light source holder 78 and the light sources 76 may be directly attached to the light leakage preventing member 200.

Accordingly, where the mold frame 62 is omitted in the exemplary embodiment of the liquid crystal display of FIGS. 7 and 8 described above, in the exemplary embodiment illustrated in FIG. 9, each of the mold frame 62, the auxiliary chassis 15 and the light source holder 78 (refer to FIGS. 16 and 8) may be omitted and thus the structure of the liquid crystal display may be further simply manufactured.

Hereinafter, liquid crystal displays will be described in detail with reference to FIGS. 10 and 11.

Figure 10:
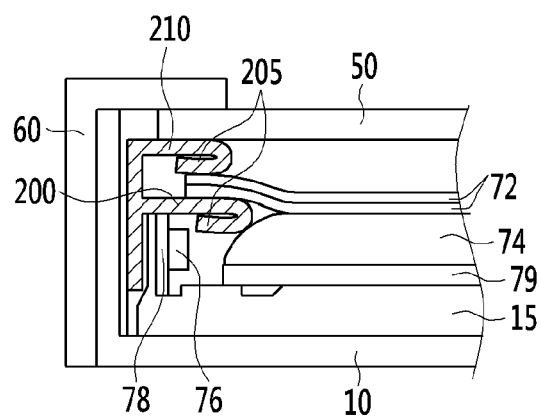
FIG. 10 is a cross-sectional view of yet another exemplary embodiment of a liquid crystal display according to the invention.

FIG. 10 is a cross-sectional view of yet another exemplary embodiment of a liquid crystal display according to the invention.

When the liquid crystal display illustrated in FIG. 10 is compared with the liquid crystal display illustrated in FIGS. 7 and 8, the two exemplary embodiments are substantially the same as each other except for the light leakage preventing member 200 and the bending part 205 formed when the end of the horizontal portion of the panel mounting part 210 is further extended, and the duplicated description is omitted.

The light leakage preventing member 200 includes a first horizontal portion disposed at one side where the light sources 76 are disposed to cover the top of the light sources 76, a first vertical portion, and a first bending part 205 extended and bent from a distal end of the first horizontal portion. The panel mounting part 210 collectively includes a second horizontal portion, a second vertical portion, and a second bending part 205 extended and bent from a distal end of the second horizontal portion. The light leakage preventing member 200 and the panel mounting part 210 may be integral with each other so as to collectively form a light leakage preventing unit.

Figure 11:
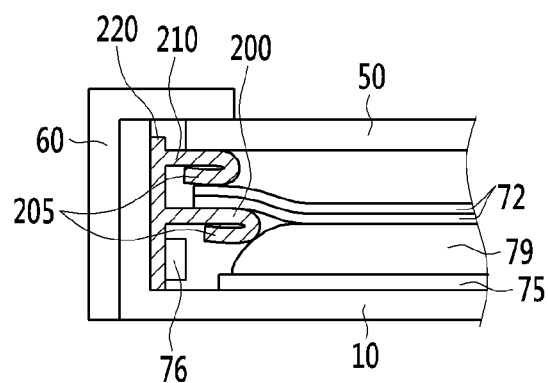
FIG. 11 is a cross-sectional view of yet another exemplary embodiment of a liquid crystal display according to the invention.

FIG. 11 is a cross-sectional view of yet another exemplary embodiment of a liquid crystal display according to the invention.

When the liquid crystal display illustrated in FIG. 11 is compared with the liquid crystal display illustrated in FIG. 10, the two exemplary embodiments are substantially the same as each other except for a panel guide part, a light source holder, and an auxiliary chassis and the duplicated description is omitted.

As illustrated in FIG. 11, the liquid crystal display further includes a panel mounting part 210 and a panel guide part 220 for fixing the panel. The light leakage preventing member 200, the panel mounting part 210 and the panel guide part 220 may be integral with each other so as to collectively form a light leakage preventing unit.

The panel guide part 220 protrudes upward from an outer surface of the panel mounting part 210 and surrounds an outermost portion of the liquid crystal panel 50 to guide the liquid crystal panel 50 to be fixed at a constant position within the liquid crystal display 100a.

Further, in liquid crystal display 100a including the light leakage preventing member 200, the light sources 76 may be directly fixed to the vertical portion of the light leakage preventing member 200, to exclude the light source holder 78 from the backlight unit 70.

The auxiliary chassis 15 (refer to FIGS. 1-6) for attaching the light source holder 78 within the backlight unit 70 may include a plastic non-conductive material and thus the separate light source holder 78 is attached to one or more of the light sources 76, but the invention is not limited thereto. Referring to FIG. 11, the light leakage preventing member 200 may include a metallic material, and the metallic material has a conductive property. Thus, the conductive vertical portion of the light leakage preventing member 200 is usable as a light source holder, and as a result, the backlight unit 70 excludes the separate light source holder 78 and the light sources 76 may be directly attached to the light leakage preventing member 200.

Referring to FIGS. 10 and 11, the bending parts 205 of the light leakage preventing member 200 and the panel guide 210 are disposed to correspond to all sides of the bottom chassis 10, but the invention is not limited thereto. In an exemplary embodiment, referring to FIGS. 10 and 11, the bending parts 205 may disposed at only the side of the bottom chassis 10 where the light sources 76 are disposed.

Further, referring to FIGS. 10 and 11, the panel mounting part 210 includes the bending part 205 at all sides of the bottom chassis 10, but the invention is not limited thereto. In an exemplary embodiment, referring to FIGS. 10 and 11, the panel mounting part 210 excludes the bending part 205 (to only have the horizontal portion) and only the light leakage preventing member 200 includes the bending part 205.

As such, in one or more exemplary embodiment of the backlight assembly and the liquid crystal display including the same according to the invention, the light leakage preventing member is disposed to cover the top of the light source and thus the light leakage may be prevented at the end of the optical member. In one or more exemplary embodiment, the mold frame for mounting the panel may be omitted by additionally including the panel mounting part as a varied structure of the light leakage preventing unit also including the light leakage preventing member.

Furthermore, in one or more exemplary embodiment of the backlight assembly and the liquid crystal display including the same according to the invention, a manufacturing process of the liquid crystal display may be simplified by combining the function of a light source holder and the light leakage preventing unit together. In addition, one or more exemplary embodiment of the backlight assembly and the liquid crystal display including the same according to the invention has advantages of compensating for a standard error which may occur when manufacturing the backlight assembly, by including the light leakage preventing unit to reduce an impact which may be applied from outside the liquid crystal display.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A backlight assembly, comprising:
a light source which generates and emits light;
a light leakage preventing member including a first horizontal portion and a first vertical portion;
a panel mounting part spaced apart from the light leakage preventing member and on which a display panel is disposed;
a light guide plate including a light output surface through which the light exits to the display panel and a light input surface and;
an optical sheet disposed on the light output surface of the light guide plate, and between the light leakage preventing member and the panel mounting part spaced apart from each other; and
a bottom chassis configured to receive the light source, the light leakage preventing member and the light guide plate therein,
wherein
the light source is disposed at a side of the light guide plate,
the first vertical portion of the light leakage preventing member is attached to a rear surface of the light source, and
the first horizontal portion of the light leakage preventing member is disposed above the light source and extends from the light source to be disposed between the light output surface of the light guide plate and the optical sheet.

2. The backlight assembly of claim 1, wherein:
the light leakage preventing member further includes a first bending part extended to be bent from a distal end of the first horizontal portion of the light leakage preventing member, and
the first bending part is curved toward the first vertical portion from the distal end of the first horizontal portion.

3. The backlight assembly of claim 2, wherein:
a surface of the first bending part curved toward the first vertical portion from the distal end of the first horizontal portion, and a surface of the first horizontal portion, face each other and are spaced apart from each other.

4. The backlight assembly of claim 1, wherein:
the panel mounting part is integral with the light leakage preventing member, and includes:
a second vertical portion extended from the first vertical portion of the light leakage preventing member, and
a second horizontal portion extended from the second vertical portion to be spaced apart from the first horizontal portion of the light leakage preventing member,
wherein the light leakage preventing member and the panel mounting part are disposed at all sides of the bottom chassis at which the light source is disposed.

5. The backlight assembly of claim 4, further comprising:
an auxiliary chassis which is received in the bottom chassis,
wherein
the light leakage preventing member is coupled to and fixed between the bottom chassis and a side portion of the auxiliary chassis, and
the light source is attached to the side portion of the auxiliary chassis.

6. The backlight assembly of claim 4, wherein:
the light leakage preventing member further includes a first bending part extended to be bent from a distal end of the first horizontal portion of the light leakage preventing member; and
the panel mounting part further includes a second bending part extended to be bent from a distal end of the second horizontal portion of the panel mounting part,
wherein
the first bending part is curved toward the first vertical portion from the distal end of the first horizontal portion, and
the second bending part is curved toward the second vertical portion from the distal end of the second horizontal portion.

7. The backlight assembly of claim 6, wherein:
a surface of the first bending part curved toward the first vertical portion from the distal end of the first horizontal portion, and a surface of the first horizontal portion, face each other to be spaced apart from each other, and
a surface of the second bending part curved toward the second vertical portion from the distal end of the second horizontal portion, and a surface of the second horizontal portion, face each other to be spaced apart from each other.

8. The backlight assembly of claim 4, further comprising:
a panel guide part extended from and integral with the panel mounting part.

9. The backlight assembly of claim 8, further comprising:
the light leakage preventing member further includes a first bending part extended to be bent from a distal end of the first horizontal portion of the light leakage preventing member; and
the panel mounting part further includes a second bending part extended to be bent from a distal end of the second horizontal portion of the panel mounting part,
wherein
the first bending part is curved toward the first vertical portion from the distal end of the first horizontal portion, and
the second bending part is curved toward the second vertical portion from the distal end of the second horizontal portion.

10. The backlight assembly of claim 9, wherein:
a surface of the first bending part curved toward the first vertical portion from the distal end of the first horizontal portion, and a surface of the first horizontal portion, face each other to be spaced apart from each other, and
a surface of the second bending part curved toward the second vertical portion from the distal end of the second horizontal portion, and a surface of the second horizontal portion, face each other to be spaced apart from each other.

11. The backlight assembly of claim 9, wherein:
the light leakage preventing member, the panel mounting part and the panel guide part each include a metallic material, and the light source is directly attached to the first vertical portion of the light leakage preventing member.

12. A liquid crystal display, comprising:
a liquid crystal panel which displays an image; and
a backlight assembly which supplies light to the liquid crystal panel,
wherein the backlight assembly includes:
   a light source which generates and emits the light,
   a light leakage preventing member including a first horizontal portion and a first vertical portion,
   a panel mounting part spaced apart from the light leakage preventing member and on which the liquid crystal display panel is disposed,
   a light guide plate including a light input surface and a light output surface,
   an optical sheet disposed to overlap the light output surface of the light guide plate and, and disposed between the light leakage preventing member and the panel mounting part spaced apart from each other; and
   a bottom chassis configured to receive the light source, the light leakage preventing member and the light guide plate therein,
wherein
the light source is disposed at a side of the light guide plate,
the first vertical portion of the light leakage preventing member is attached to the rear surface of the light source at a side of the bottom chassis, and
the first horizontal portion of the light leakage preventing member is disposed above the light source and extends from the light source to be disposed between the light output surface of the light guide plate and the optical member.

13. The liquid crystal display of claim 12, wherein:
the light leakage preventing member further includes a first bending part extended to be bent from a distal end of the first horizontal portion of the light leakage preventing member, and
the first bending part is curved toward the first vertical portion from the distal end of the first horizontal portion.

14. The liquid crystal display of claim 13, wherein:
a surface of the first bending part curved toward the first vertical portion from the distal end of the first horizontal portion, and a surface of the first horizontal portion, face each other and are spaced apart from each other.

15. The liquid crystal display of claim 13, wherein:
the panel mounting part is integral with the light leakage preventing member, and includes:
   a second vertical portion extended from the first vertical portion of the light leakage preventing member,
   a second horizontal portion extended from the second vertical portion to be spaced apart from the first horizontal portion, and
   a second bending part extended to be bent from a distal end of the second horizontal portion and curved toward the second vertical portion,
wherein the light leakage preventing member and the panel mounting part are disposed at all sides of the bottom chassis at which the light source is disposed.

16. The liquid crystal display of claim 15, wherein the backlight assembly further comprises:
a panel guide part extended from and integral with the panel mounting part.

* * * * *